Figures 1, 2:
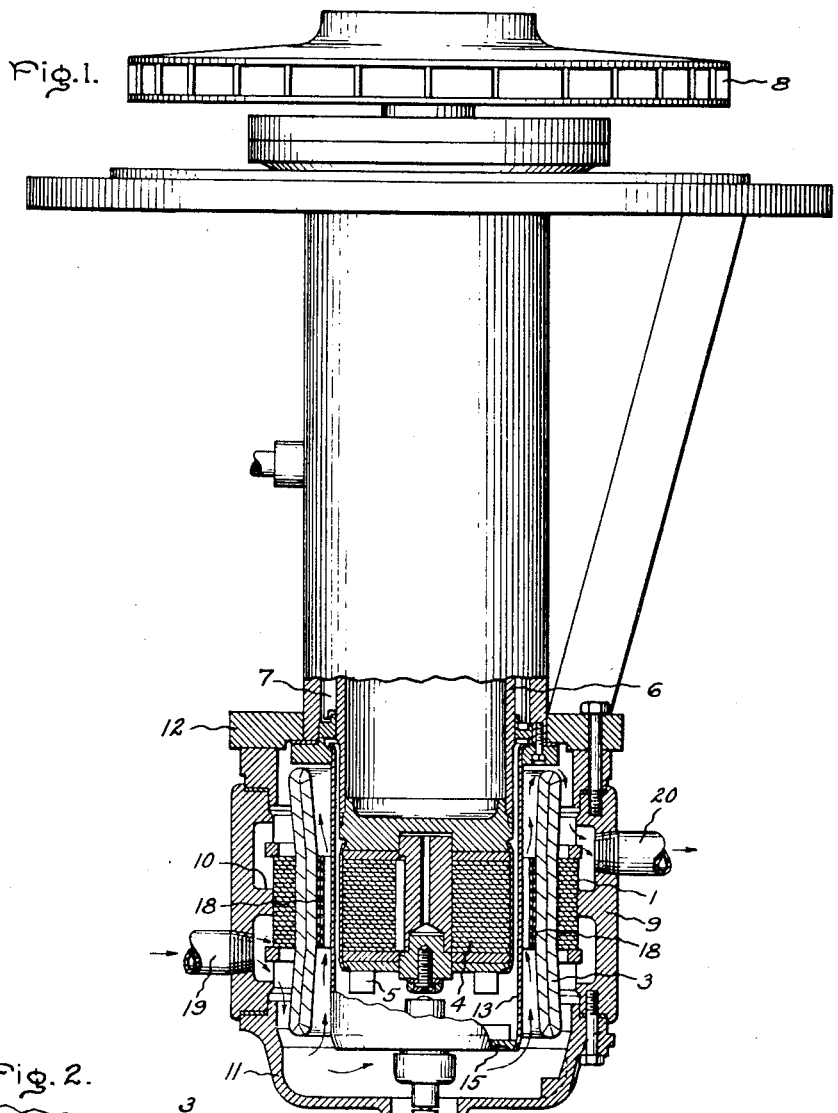

Feb. 14, 1950　　　M. ANDERSON　　　2,497,650
DYNAMOELECTRIC MACHINE
Filed Dec. 28, 1945

Inventor:
Marshall Anderson.
by Prowell F. Mack
His Attorney.

Patented Feb. 14, 1950

2,497,650

UNITED STATES PATENT OFFICE 2,497,650

DYNAMOELECTRIC MACHINE

Marshall Anderson, Marblehead, Mass., assignor to General Electric Company, a corporation of New York Application December 28, 1945, Serial No. 637,735

2 Claims. (Cl. 171—252)

My invention relates to dynamoelectric machines and particularly to such a machine provided with a forced circulation cooling system.

An object of my invention is to provide an improved dynamoelectric machine.

Another object of my invention is to provide an improved cooling system for a dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an elevational view, partly in section, illustrating an embodiment of my improved dynamoelectric machine; and Fig. 2 is an enlarged sectional view through a part of the stationary member core and winding showing the arrangement of the coil retaining members and the air gap diaphragm member relative to the stationary member core.

Referring to the drawing, I have shown an embodiment of my invention applied to a dynamoelectric machine which comprises a motor having a stationary member provided with a laminated core 1 of magnetic material with winding slots 2 formed therein in which an exciting winding 3 is arranged. The motor is provided with a rotatable member having a laminated core 4 of magnetic material with a squirrel cage winding 5 arranged in winding slots formed in the core 4 and adapted to react electrodynamically with the stationary member of the machine to provide a driving torque to a shaft 6 mounted in suitable bearings 7 and adapted to drive any desired load, such as an impeller 8. In the illustrated construction, it is desired to provide for suitable cooling of the stationary member of the machine by forced circulation of the ventilating fluid through the stationary member and over the part thereof in which heat is generated. This is obtained by mounting the stationary member core 1 in an enclosing housing 9 which is formed with an internally extending flange 10 arranged in tight engagement with the outer peripheral surface of the core 1 to form a barrier between the two ends of the machine. An end shield 11 closes the lower end of the machine, and an upper end shield 12 closes the upper end of the machine. This enclosing housing construction is completed by a thin diaphragm member 13 of non-magnetic material which is secured in any suitable manner to the upper end shield member 12 so as to provide a seal therewith and extends in close contact with the inner air gap ends of stationary member core teeth 14 to provide a seal over the ends of these teeth. This diaphragm member 13 is provided with a lower closure plate 15 which forms a complete enclosing housing around the elements of the stationary member of the machine extending over both inner and outer sides and both ends thereof. The stationary member exciting winding 3 may be made in any conventional manner and may be provided with inner and outer turns which are separated by suitable insulating members 16 and insulated from the sides of the winding slots by suitable insulating material 17. The exciting winding 3 is held in position away from the outer edge of the winding slots 2 by U-section members 18 of insulating material, such as fiber, which extend longitudinally through each of the slots over the air gap side of the winding with the bases of the U-section members arranged away from the open ends of the slots and towards the winding, thereby providing cooling fluid passages through the winding slots 2 communicating with each end of the housing on each side of the core 1 and the winding 3.

The machine is adapted to be cooled by circulation of cooling fluid through the machine which is supplied to the interior of the housing by a cooling fluid supply connection 19 through which oil or other suitable cooling fluid may be pumped into the housing on one end of the stationary member core 1 and winding 3, from which it will pass through the cooling fluid passages formed by the U-section members 18 in the winding slots 2 to the other end of the stationary member and pass over the sides of the core 1 and the winding 3 into intimate contact therewith for the removal of heat therefrom, and then be exhausted from the stationary member housing through a suitable cooling fluid exhaust connection 20. In this manner the cooling fluid is not only circulated in good heat transferring contact with the core 1 of the stationary member and the end turns of the winding 3, but also flows in direct contact with portions of the nonmagnetic diaphragm enclosing member 13, thereby removing heat from this member which may be conducted thereto from the stationary member core teeth 14 or may be generated in the diaphragm member as eddy currents.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a stationary member and rotatable member, said stationary member having a core of magnetic material with winding slots therein and a winding in said slots with a housing totally enclosing said core and winding, said housing including a thin diaphragm of nonmagnetic material extending through an air gap between said rotatable and stationary members and closing the ends of said winding slots, means including U-shaped members of insulating material extending longitudinally through each of said slots adjacent said winding arranged with the base of each U for retaining said winding in position and with the legs of each U extending away from said winding for providing with said diaphragm substantially closed cooling fluid passages through said winding slots communicating with each end of said housing on each side of said core and winding providing for circulation of cooling fluid from one side of said housing to the other side of said housing over the sides of said stationary member core and winding for cooling said machine.

2. A dynamoelectric machine member core of magnetic material comprising laminations and having a peripheral surface extending transverse to the plane of said laminations, winding slots in said core each extending a predetermined distance radially away from said peripheral surface and each extending longitudinally the axial length of said core, said slots each having a narrow slot mouth defining slot mouth shoulders adjacent said periphery, a circular shell arranged adjacent said peripheral surface and closing said slot mouths, a winding having elements each located within one of said slots and each having a radial depth substantially less than said predetermined distance, a plurality of resilient U-section members of insulating material each arranged in one of said slots with the base of the U arranged adjacent the associated winding element and the extreme ends of the legs of the U arranged adjacent said slot mouth shoulders to resiliently bias said winding element away from said periphery and to provide a longitudinal cooling passage between said U-section member and said circular shell and from one end to the other of said core, means for supplying cooling fluid to one end of each of said slots, and means for exhausting cooling fluid from the other end of each of said slots.

MARSHALL ANDERSON.

REFERENCES CITED

The following references are of record in the file of this patent:

UNITED STATES PATENTS

| Number | Name | Date |
|---|---|---|
| 1,227,414 | Field | May 22, 1917 |
| 1,279,810 | Williamson | Sept. 24, 1918 |
| 1,291,459 | Field et al. | Jan. 14, 1919 |
| 1,448,700 | Seidner | Mar. 13, 1923 |
| 1,504,622 | Hellmund | Aug. 12, 1924 |
| 2,390,130 | Sigmund | Dec. 4, 1945 |

FOREIGN PATENTS

| Number | Country | Date |
|---|---|---|
| 15,148 | Great Britian | of 1913 |
| 165,806 | Great Britain | July 11, 1921 |